US 8,516,530 B2

(12) United States Patent
Sakhardande et al.

(10) Patent No.: US 8,516,530 B2
(45) Date of Patent: Aug. 20, 2013

(54) REDUCING THE NETWORK LOAD OF EVENT-TRIGGERED VIDEO

(75) Inventors: Amit S. Sakhardande, Fremont, CA (US); Todd M. Baker, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1467 days.

(21) Appl. No.: 11/760,377

(22) Filed: Jun. 8, 2007

(65) Prior Publication Data
US 2008/0304565 A1 Dec. 11, 2008

(51) Int. Cl.
*H04N 7/173* (2011.01)
(52) U.S. Cl.
USPC .............................................. 725/89; 725/28
(58) Field of Classification Search
None
See application file for complete search history.

(56) References Cited

U.S. PATENT DOCUMENTS

| 6,675,386 | B1 | 1/2004 | Hendricks et al. | |
|---|---|---|---|---|
| 6,693,533 | B2 | 2/2004 | Ebata et al. | |
| 6,747,554 | B1 | 6/2004 | Higashimura et al. | |
| 6,757,008 | B1 | 6/2004 | Smith | |
| 6,970,183 | B1 | 11/2005 | Monroe | |
| 7,051,356 | B2 | 5/2006 | Weinstein | |
| 7,130,908 | B1 | 10/2006 | Pecus et al. | |
| 7,154,898 | B1 | 12/2006 | Pecus et al. | |
| 2006/0020982 | A1* | 1/2006 | Jerding et al. | 725/89 |
| 2007/0162304 | A1* | 7/2007 | Rodgers | 705/2 |

\* cited by examiner

*Primary Examiner* — Kaveh Abrishamkar
(74) *Attorney, Agent, or Firm* — Merchant & Gould

(57) ABSTRACT

In one embodiment, a method for reducing the network load of an event-triggered video system comprising transmitting a first 'play' indication by a controlling process over a data network, to an appropriately configured video encoding process, transmitting first video data by the encoding process in response to receiving the first 'play' indication, the first video data being transmitted over the data network through a communication channel established over the data network between the encoding process and a recording process and receiving the first video data by the recording process.

20 Claims, 4 Drawing Sheets

REDUCING THE NETWORK LOAD OF EVENT-TRIGGERED VIDEO

FIELD OF THE INVENTION

The present disclosure relates generally to event-triggered video.

BACKGROUND

Any discussion of the prior art throughout the specification should in no way be considered as an admission that such prior art is widely known or forms part of the common general knowledge in the field.

IP Video Surveillance can put an enormous strain on existing network when deployed, typically requiring network upgrades. The transmission and storage of continuous video streams puts considerable strain on both bandwidth and storage capacity in a network system.

There are presently two primary methods of optimizing video with events. The first method is to have the encoding device store video locally and then offline forward (for example FTP) the video to a centralized data storage device. The second method involves managing the video storage based on event-triggers sent to the recording device wherein the recorder will receive a constant stream of video data from the encoding device.

OVERVIEW

There is a need in the art for better methodologies for dealing with event-triggered video. It is an object to addresses this need.

Described herein is a method and apparatus for reducing the network load of event-triggered video.

In accordance with an embodiment, there is provided a method for reducing the network load of an event-triggered video system, the method comprising:
- transmitting a first 'play' indication by a controlling process over a data network, to an appropriately configured video encoding process;
- transmitting first video data by the encoding process in response to receiving the first 'play' indication, the first video data being transmitted over the data network through a communication channel established over the data network between the encoding process and a recording process; and
- receiving the first video data by the recording process.

In accordance with another embodiment, there is provided an apparatus for reducing network load of event-triggered video. The apparatus comprising at least one encoding device configured to receive a 'play' indication for transitioning to a transmitting state and transmitting video data, and wherein each encoding device is further configured to receive a 'pause' indication for transitioning to a buffering state and buffering a predefined portion of the most recently received video data; and at least one recording device configured to transmit the 'play' and the 'pause' indication to a respective encoding device, each recoding device is further configured to produce a recording of at least part of the video data, wherein each encoding and recording device is coupleable to each other device by a data network.

In accordance with a further embodiment, there is provided an apparatus comprising at least one controlling device configured to perform a controlling process for transmitting a 'play' and a 'pause' indication. The 'play' indication, when received by at least one encoding device configured to perform an encoding process, transitions each encoding process to a transmitting state and transmits video data. The 'pause' indication, when received by at least one encoding device, transitions each encoding process to a buffering state and buffers a predefined portion of the most recently received video data.

Other aspects and advantages will be apparent from the description and claims provided herein.

BRIEF DESCRIPTIONS OF THE DRAWINGS

A preferred embodiment will now be described, by way of example only, with reference to the accompanying drawings in which.

DESCRIPTION OF EXAMPLE EMBODIMENTS

Described herein is a method and apparatus for reducing the network load of event-triggered video.

The typical system components include one or more video encoding devices, recording devices, and live monitoring clients. The following embodiments focus on the interface between the recording device and the encoding device.

Event-triggered video is one method used in recording of IP Video Surveillance data. These events can be as simple as TTL logical events communicated via a direct coupling to the system or as sophisticated as video analytics utilizing raw video interpretation to generate digital domain events. For example analog motion sensors, door open/close contacts, etc may provide these logical events.

Figure 1:
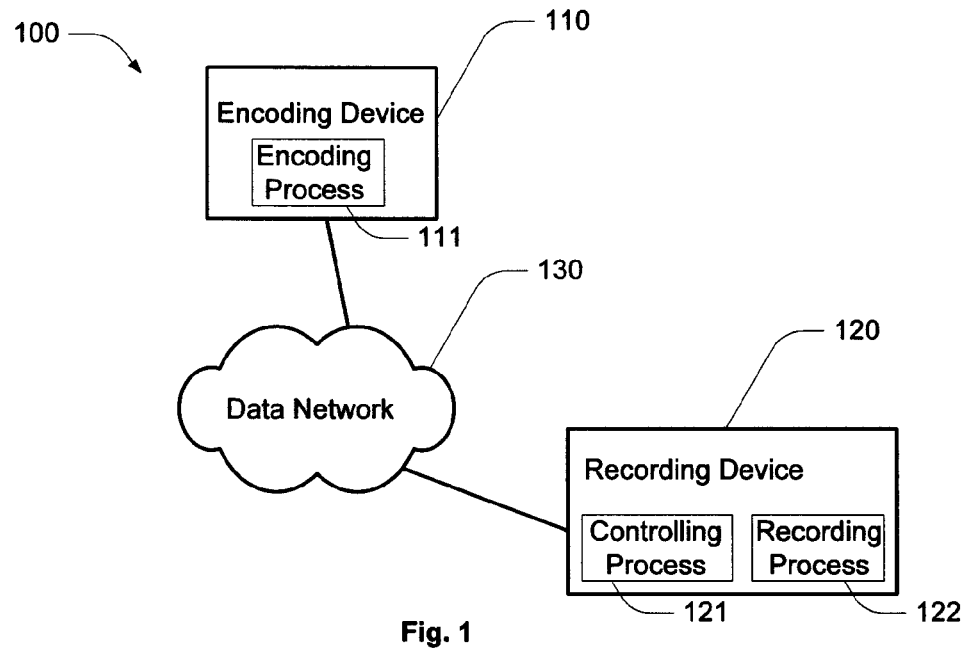
FIG. 1 illustrates an example system for reducing network load of event-triggered video.

Referring initially to FIG. 1 of the drawings, an embodiment provides a system 100 that is scalable and reduces network overhead for event-triggered video, using standards based protocols. In this system, there are two distinct components of this system, being the encoding device 110 and the recording device 120. These devices are coupled together by a data network 130 for transmitting and receiving indications and video data. In this embodiment, the encoding device 110 is characterised by an encoding process 111, and the recording device 120 is characterised by a controlling process 121 and a recording process 122.

The first component is the encoding process 111 having a method to pause the video, which is activated by a 'pause' indication. These indications are transmitted thought a data network in a conventional manner. In one embodiment indications may be provided though a HTTP XML interface. In another embodiment indications may be provided through the standard RSTP 'pause' or HTTP to allow for simplified solutions and improved third party interoperability. In further embodiments indications may be provided to any like interface. When the encoding process receives the 'pause' indication it keeps the video session alive (e.g. channel open, or TCP socket open) but stops sending video data over this session. Instead the encoding process sends the video data to a local buffer and maintains a predefined amount of the most recent video data in this buffer. Typically the buffer is implemented as a rolling or circular buffer, wherein the video data older than the predefined time is overwritten by the new video data. This occurs as the insertion point for the new data within the buffer cycles around the buffer.

The encoding process, upon receiving a 'play' indication while in a buffering state will begin streaming the video data from the buffer including any new video data that is to be sent to the buffer. This occurs until a 'pause' or 'stop' indication is received. If a 'stop' indication is received the encoding process will flush the buffer and free all resources.

Figure 2:
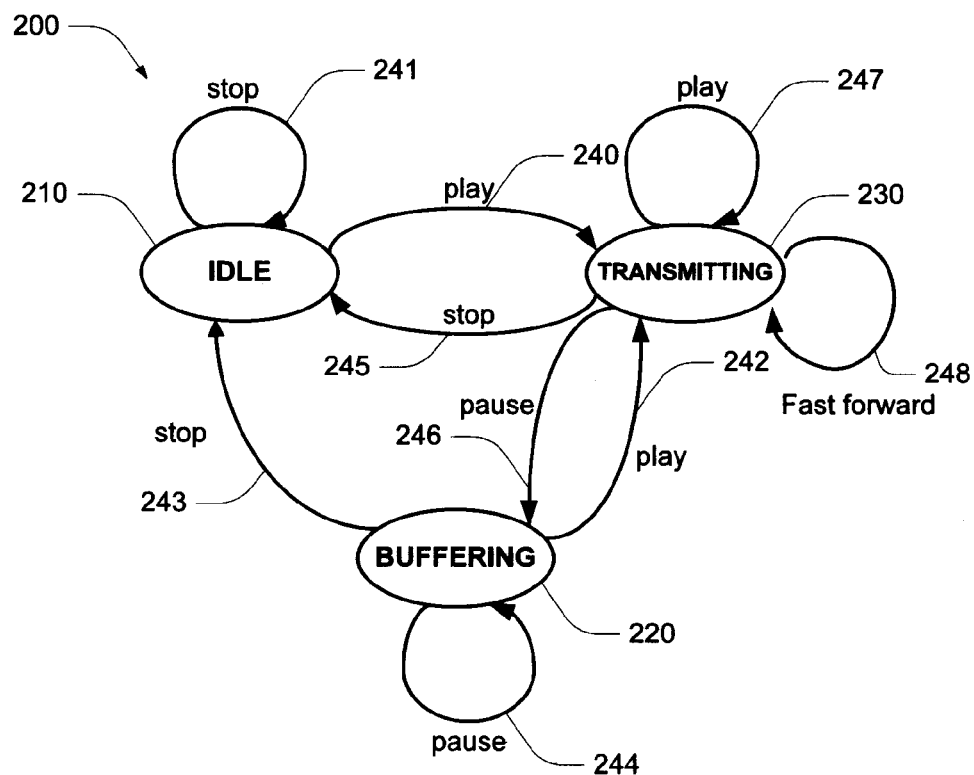
FIG. 2 is an example state diagram for the encoding process of FIG. 1.

FIG. 2 shows the state diagram 200 for this encoding process. This process includes three states being an idle state 210, a buffering state 220 and a transmitting state 230. The default starting point for this process is the idle state 210. In the idle state 210 no resources are allocated and no video is buffered or transmitted. The idle state 210 will only be exited through the receipt of a 'play' indication transitioning 240 the process into the transmitting state 230. In the transmitting state 230 the encoding process streams video data from the buffer and any new video data that is to be sent to the buffer. In the transmitting state 230 a 'stop' indication transitions 245 the process back to the idle state 210 while a 'pause' indication transitions 246 the process to the buffering state 220. The buffering state 220 triggers the local buffering of video data. The local buffer can be of different lengths including in some embodiments a null buffer containing only recent live video data. In the buffering state 220 the receipt of a 'stop' indication releases all resources and resets the process by transitioning 243 through to the idle state 210. In the buffering state 220 the receipt of a 'play' indication transitions 242 the process to the transmitting states causing the buffered content collected in buffering state 220 to be transmitted, followed by the transmission of live content delayed by the buffer length. While in the transmitting state 230 receipt of a 'fast forward' indication 248 will increase the transmission speed by a configurable amount faster than real-time. It will be appreciated that the transmission of buffered video data can be at a rate greater than the encoding rate, whereby the subsequent transmission of live content by the encoding process can be less than the delay related to the buffer length or substantially real-time.

When the encoding process is in the idle state 210, receiving a
  (a) 'play' indication transitions 240 to the transmitting state 230;
  (b) 'stop' indication transitions 241 a return the idle state 210.

When the encoding process is in the buffering state 220, receiving a
  (a) 'play' indication transitions 242 to the transmitting state 230;
  (b) 'stop' indication transitions 243 to the idle state 210;
  (c) 'pause' indication transitions 244 a return the buffering state 220.

When the encoding process is in the transmitting state 230, receiving a
  (a) 'stop' indication transitions 245 to the idle state 210;
  (b) 'pause' indication transitions 246 to the buffering state 220;
  (c) 'play' indication transitions 247 a return the transmitting state 230.
  (d) 'fast forward' indication 248 causes the video transmission rate to increase by a configurable amount faster than real-time buffered speed resuming normal operation upon receipt of 'play' indication 247 or at the end of the pre-defined buffered length returning to live operations.

Referring back to FIG. 1, the second component is the video recording device 120, which is characterised by a controlling process 121 and a recording process 122. The controlling process is configured to transmit 'play', 'pause', 'fast forward' and 'stop' indications over the network to an encoding process associated with a relevant video stream. The recording process 122 is configured to record received video data. In one embodiment the recording device 120, including both a controlling process 121 and recording process 122, is capable of capturing indications from other devices on the network.

Further examining the 'play', 'pause', 'fast forward' and 'stop' indications.

The 'play' indication is used to start the encoding process and transmitting a video data stream regardless of whether event driven storage is implemented. The 'pause' is implemented such that, in the case of an event driven recording, the recording device will initially start the stream with a 'play' indication, verify that the connection is valid and video is received, then issue a 'pause' indication to put the encoding process into a buffering state.

The 'fast forward' indication is used to bring the transmission of buffered video data back to substantially real time transmission of video data. This is typically used to reduce the video delay resulting from transitioning from a buffering state 220 to a transmitting state 230, as shown in FIG. 2. The buffer video data is buffered at a predetermined recording data rate. The encoding device, in the transmitting state, responding by progressing through the video buffer faster than the recording data rate for bringing the buffered video data closer to substantially real time transmission of video data. In some embodiments, the transmission of buffer video data is at a data rate faster than the recording data rate. This may be determined by the data network capacity or the recording capacity of the recording device.

The 'stop' indication will be implemented to cause the encoding process to terminate any active session to the recording device.

In a further embodiment, the indication definition includes an 'archive' indication that is used to gather buffered video from an encoding process. This includes pre-event and post-event archival time. This 'archive' indication allows the recorder to derive sufficient information about how it is to interact with the encoding process.

Figure 3:
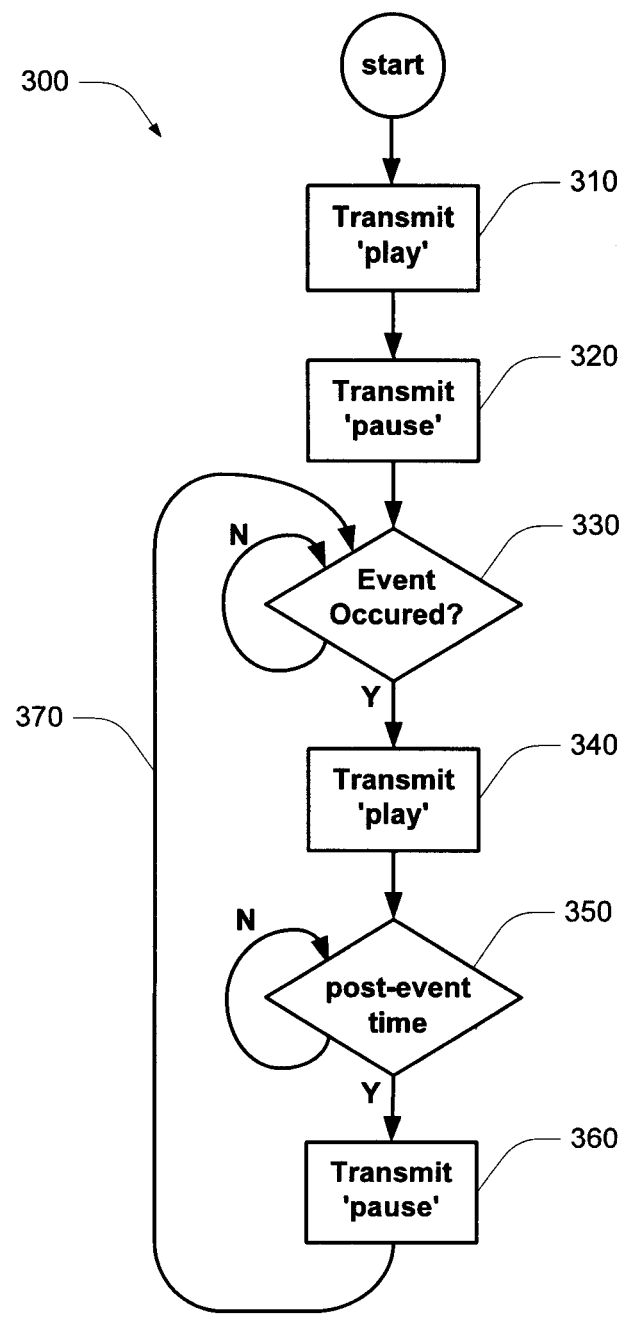
FIG. 3 is an example operational flow diagram of the controlling process for the recording device of FIG. 1.

FIG. 3 shows the operational flow diagram 300 for an embodiment of the controlling process 121. In one embodiment, this operation of the recording device comprises:
  (a) transmitting an initial 'play' indication 310 for stream validation;
  (b) transmitting a 'pause' indication 320 to send the encoder into a buffering idle state;
  (c) waiting until the event to occur 330;
  (d) transmitting a 'play' indication 340, once the event occurs;
  (e) leaving the channel open for receiving the predefined pre-event and post-event times 350;
  (f) transmitting a 'pause' indication 360 to send the encoder back into a buffering state; and
  (g) returning to step (c) 370.

A 'stop' indication will flush the buffer and tear down connections.

Steps (c) though (f) are repeated for each event-trigger that is received by the controlling process.

This method is preferably achieved by creating indication primitives that are understood by both the encoding and recording device, allowing for a substantially reduced usage of bandwidth across the network connection between an encoding device and a recording device for the video stream while no event is detected. This reduces the total data transferred to data of a higher presumed relevance to the triggering event. In one embodiment, the controlling process within the recording device controls this method for improved scalability.

This method provides the ability of the recorders to determine or control the most appropriate time to send the video from the encoding devices while still allowing for buffered data to be utilized for pre-event monitoring.

Figure 4:
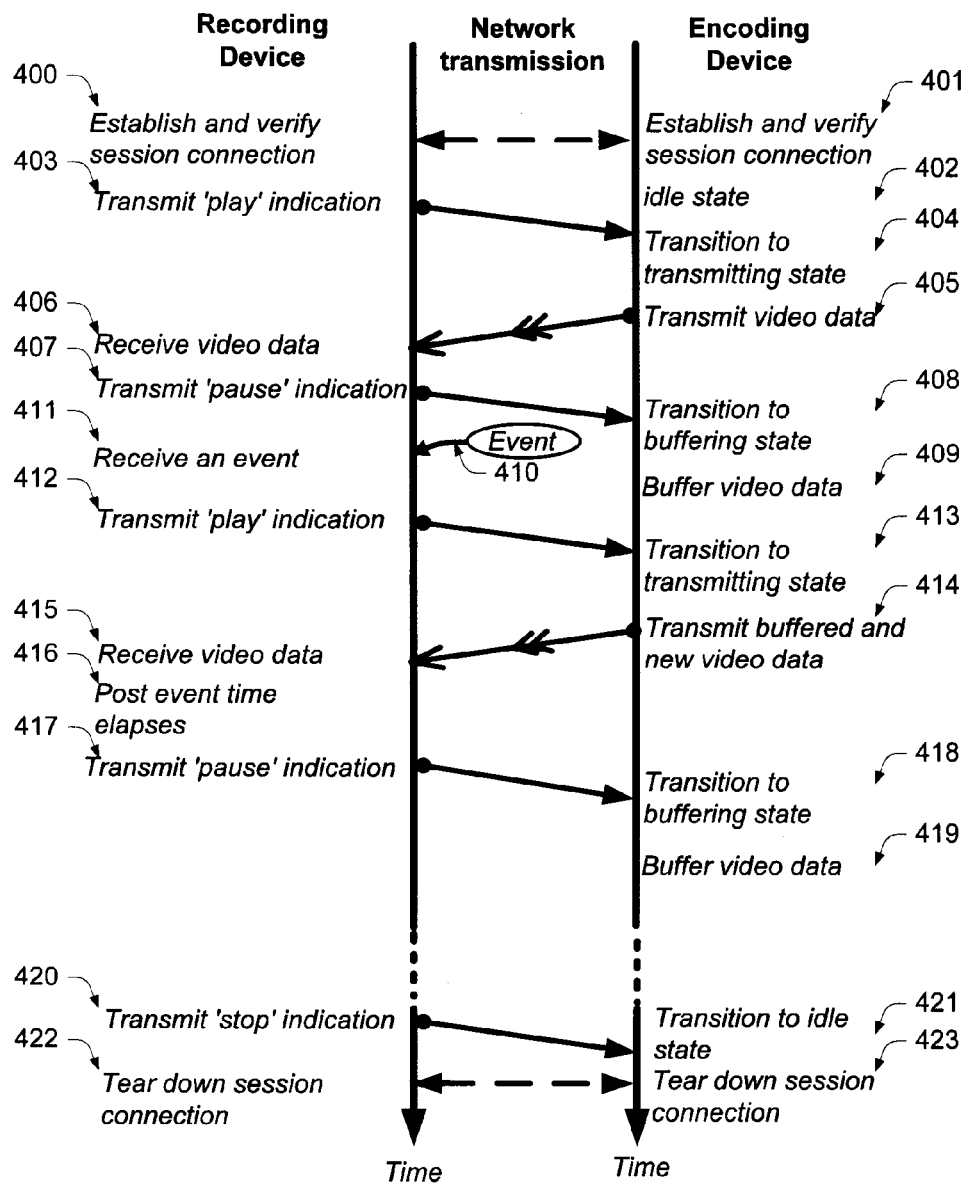
FIG. 4 illustrates an example of network communications passing between the encoding device and recording device of FIG. 1.

FIG. 4 shows the network communications, of an embodiment, passing between an encoding device having and encoding process, and a recording device, having controlling process and a recording process, by way of example only.

A session is established between the controlling process and encoding process 400 and 401. The encoding process is initialised to the idle state 402.

The controlling process sends a 'play' indication 403, which is received by the encoding process and causes it to transition to the transmitting state 404. The encoding process then transmits video data 405, which is received by the recording process 406. This assists in confirming that a valid connection has been established. The controlling process then obtains sufficient information about how the encoding process operates.

The controlling process then transmits a 'pause' indication 407, which is received by the encoding process and causes it to transition to the buffering state 408. While the encoding process is in the buffering state it buffers a pre-defined amount of the most recent video data 409.

An event is triggered 410 and received by the controlling process 411. The controlling process, where and when appropriate, transmits a 'play' indication to the encoding process 412. When the encoding process receives the 'play' indication it transitions to the transmitting state 413 and commences transmitting the contents of the video data buffer and any subsequently processed video data 414.

This video data is then received by the recording process 415 and is stored (or recorded). The controlling process determines when the post-event time has elapsed 416 and transmits a 'pause' indication 417 to the encoding process. The encoding process receives the 'pause' indication and transitions to the buffering state 418. While the encoding process is in the buffering state it buffers, in a roll-over fashion, a pre-defined amount of the most recent video data 419.

When terminating a session the controlling process transmits a 'stop' indication 420 to the encoding process. The encoding process receives the 'stop' indication and transitions to the idle state 421, causing it to flush its video buffer. The network connection is then terminated in a data network in a conventional manner for whatever protocol was providing the data transport.

It will be appreciated that a controlling device is any device configured at least in part to perform a controlling process and a recording device is any device configured at least in part to perform a recording process. Referring back to FIG. 1, a single device may be configured to perform both a controlling process 121 and a recording process 121. It will be further appreciated that in other embodiments, a controlling process and a recording process may be in separate, but coupled, devices.

Figure 5:
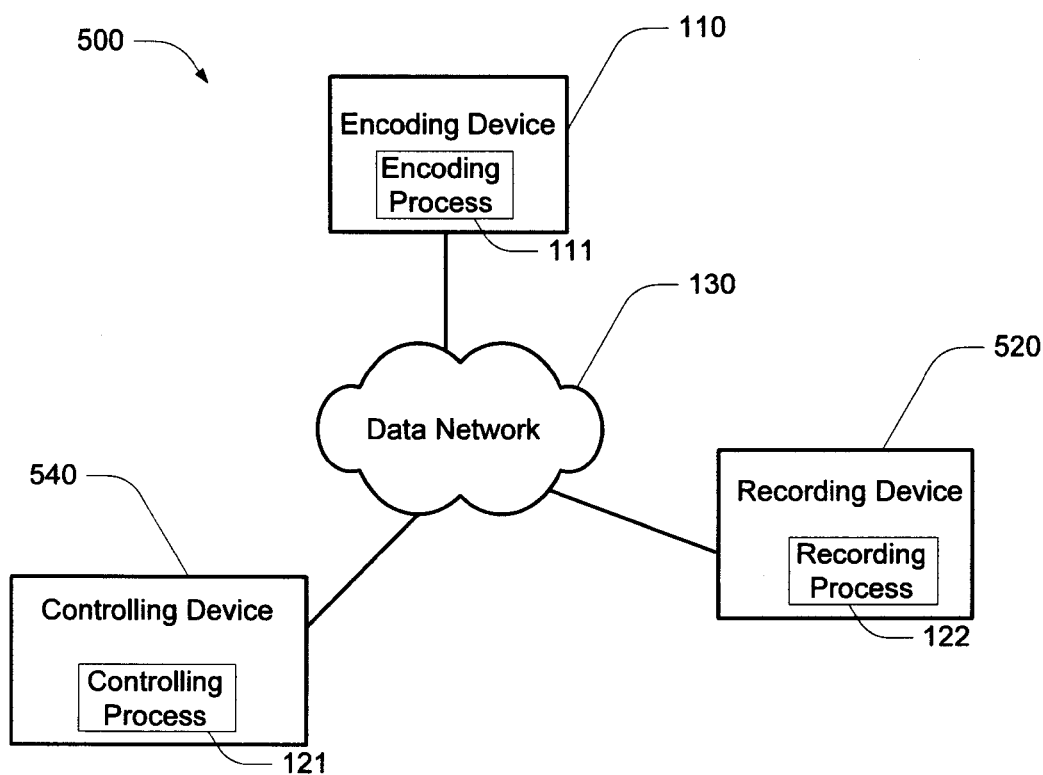
FIG. 5 illustrates an alternative example system for reducing network load of event-triggered video.

Referring to FIG. 5, an alternative embodiment provides a system 500 that is scalable and reduces network overhead for event-triggered video, using standards based protocols. In this system, there are three distinct components, being the encoding device 110, the recording device 520 and the controlling device 540. These devices are coupled together by a data network 130 for transmitting and receiving indications and video data. In this embodiment, the encoding device 110 is characterised by an encoding process 111, the recording device 520 is characterised by a recording process 122, and the controlling device 540 is characterised by a controlling process 121.

Instead of the controlling and recording processes being internally and physically coupled within a recoding device 120, as shown in FIG. 1, these processes may be separately distributed across the network within the recording device 520 and controlling device 540, as shown in FIG. 5. Conceptually, these processes communicate the same information across a different medium.

In further embodiment, the system includes at least one encoding device; wherein each encoding device is configured to perform an encoding process. Each encoding device is configured to receive a 'play' indication for transitioning to a transmitting state and transmitting video data. Each encoding device is further configured to receive a 'pause' indication for transitioning to a buffering state and buffering a predefined portion of the most recently received video data. The system further includes at least one recording device configured to execute a recording process for producing a recording of at least part of said video data, and at least one controlling device configured to execute a controlling process for transmitting said 'play' and 'pause' indication. Each recording, controlling and encoding device is coupleable to each other device by a data network.

In further embodiments the system includes a plurality of encoding devices and a plurality of recording devices all coupled to a data network. Alternatively, one encoding device may be operatively associated with more than one recording device. Similarly, a recoding device may be operatively associated with more than one encoding device. Likewise, a single controlling process may operatively associate with a plurality of recording processes and a plurality of encoding devices.

In an embodiment, the data network may comprise a plurality of sub-networks and/or a plurality of parallel networks. Conceptually, the data network only provides a vehicle for transporting indications and video data.

It will be appreciated that the embodiments described above can be used in IP Video Surveillance Networks as a method for intelligent video storage in any solution where pseudo real-time video is stored for later review. This does not preclude the simultaneous existence of real-time monitoring in the same solution.

It will be appreciated that the embodiments described above provide a more efficient method for event based video recording.

Further Interpretation

Unless specifically stated otherwise, as apparent from the following discussions, it is appreciated that throughout the specification discussions utilizing terms such as "process", "processing", "computing", "calculating", "determining" or the like, refer to the indication and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify indications to be taken are included. Thus, one example is a typical processing system that includes one or more processors. Each processor may include one or more of a CPU. The instructions may reside, completely or at least partially, in any storage medium (e.g. substantially permanent in a hard disk, or volatile RAM). Thus, the storage medium and the processor also constitute computer-readable carrier medium carrying computer-readable code. Furthermore, a computer-readable carrier medium may form, or be included in a computer program product.

In alternative embodiments, the one or more processors operate as a standalone device or may be connected, e.g., networked to other processors, in a networked deployment, the one or more processors may operate in the capacity of a server or a client machine in server-client network environment, or as a peer machine in a peer-to-peer or distributed network environment.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

It will be appreciated by those skilled in the art, the described embodiments may be alternatively embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of these embodiments may take the form of a method, an entirely hardware embodiment, an entirely software embodiment or an embodiment combining software and hardware aspects. Furthermore, the present embodiments may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present embodiments. A carrier medium may take many forms, including but not limited to, non-volatile media, volatile media, and transmission media.

It will be understood that the steps of methods discussed are performed in one embodiment by an appropriate processor (or processors) of a processing (i.e., computer) system executing instructions (computer-readable code) stored in storage. It will also be understood that embodiments are not limited to any particular implementation or programming technique and that embodiments may be implemented using any appropriate techniques for implementing the functionality described herein. Embodiments are not limited to any particular programming language or operating system.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments, various features of these embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that some claims requires more features than those features expressly recited in each claim. Rather, as the following claims reflect, inventive aspects lie in less than all features of a single foregoing disclosed embodiment. Thus, the claims following the Detailed Description are hereby expressly incorporated into the Detailed Description, with each claim standing on its own as a separate embodiment.

Furthermore, while some embodiments described herein include some but not other features included in other embodiments, combinations of features of different embodiments are meant to be within the scope of the claims, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element.

In the description provided herein, numerous specific details are set forth. However, it is understood that embodiments may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto, and it is intended to claim all such changes and modifications as fall within their scope. For example, any formulas given above are merely representative of procedures that may be used. Functionality may be added or deleted from the block diagrams and operations may be interchanged among functional blocks. Steps may be added or deleted to methods described within.

We claim:

1. A method comprising:
   receiving a first 'play' indication from a controlling process over a data network at a video encoding process;
   transmitting first video data by the video encoding process in response to receiving the first 'play' indication, the first video data being transmitted over the data network through a communication channel established over the data network between the video encoding process and a recording process;
   receiving a first 'pause' indication at the video encoding process, the video encoding process ceasing transmission of the first video data in response to receiving the first 'pause' indication, wherein the pause indication is received after a predetermined time of inactivity after an event;
   transitioning the video encoding process into a buffering state in response to receiving the first 'pause' indication, wherein during the buffering state a predetermined portion of most recent video data is stored in a circular buffer, wherein the predetermined portion of the video data to be stored is determined based on a predetermined pre-event archival time and a post-even archival time, and wherein the video data older than a predetermined time in the circular buffer is overwritten by subsequently received new video data; and
   receiving a 'stop' indication at the video encoding process, wherein receiving the 'stop' indication comprises:
      terminating the video encoding process, and
      discarding the video data stored in the circular buffer.

2. A method according to claim 1 further comprising, waiting until an event-trigger signal is received by the controlling process; and beginning transmission of the first 'play' indication.

3. A method according to claim 2 further comprising, leaving said communication channel open for receiving a predefined pre-event and post-event period of said first video data; and
   transmitting, in response to the play indication, the video data stored in the circular buffer including any new video data that is to be sent to the circular buffer, followed by live video data, wherein the live video data is delayed by the circular buffer length.

4. A method according to claim 3, wherein when the video encoding process is in said buffering state, the predefined portion of the most recent video data is buffered in the circular buffer maintained by the video encoding process, wherein the most recent video data is buffered at a predetermined recording data rate.

5. A method according to claim 3, further comprising:
   receiving a first fast forward indication, while in transmitting state;
   transmitting, in response to the first 'fast forward' indication, the video data stored in the circular buffer including any new video data that is to be sent to the circular buffer faster than the recording data rate for bringing the first video data closer to substantially real time transmission of the subsequently received new video data.

6. A method according to claim 1, further comprising, transmitting a first 'archive' indication by the controlling process over the data network, to the video encoding process, the video encoding process responding by transmitting information about how it interacts with the recording process.

7. A method according to claim 1, wherein transmission of the subsequently received video data is at a data rate faster than the recording data rate.

8. A method according to claim 1, wherein the video data is surveillance video data.

9. A method according to claim 1, wherein the first video data is substantially real-time video data.

10. A method according to claim 1, further comprising:
    establishing the communication channel between the video encoding process and the recording process;
    transmitting a second 'play' indication by the controlling process over the data network, to the video encoding process;
    transmitting second video data by the video encoding process in response to receiving the second 'play' indication, the second video data is transmitted over the data network though the communication channel;
    confirming configuration settings of the video encoding process, the configuration setting including pre-event and post-event times;
    transmitting a second 'pause' indication by the controlling process over the data network, to the video encoding process;
    ceasing the video encoding process transmission of the second video data in response to receiving the second 'pause' indication; and
    transitioning the video encoding process into a buffering state in response to receiving the first 'pause' indication.

11. A method according to claim 3, further comprising,
    receiving a first fast forward indication, while in transmitting state;
    increasing a rate of video transmission by a configurable amount, wherein the rate of transmission is faster than real-time buffered speed; and
    decreasing the rate of video transmission by the configurable amount returning to live video data, based on at least one of:
       receipt of the play indication, and
       at the end of a predetermined buffered length.

12. An apparatus comprising:
    at least one encoding device configured to receive a 'play' indication for transitioning to a transmitting state and transmitting first video data, and wherein each of the encoding device is further configured to receive a 'pause' indication for transitioning to a buffering state and buffering a predefined portion of the most recently received new video data in a circular buffer, wherein the pause indication is received after a predetermined time of inactivity after an event, wherein the predetermined portion of the video data to be stored is determined based on a predetermined pre-event archival time and a post-even archival time, and wherein the video data older than a predetermined time in the circular buffer is overwritten by subsequently received new video data; and at least one recording device configured to transmit the 'play' and the 'pause' and a 'stop' indication to a respective the encoding device, each the recording device being further configured to produce a recording of at least part of the first video data, wherein the receiving a 'stop' indication at the video encoding process, wherein the 'stop' indication being configured to:

terminating the transmitting state and the buffering state, and discarding the first video data stored in the circular buffer;

wherein each the encoding and recording devices is coupleable to each other by a data network.

13. An apparatus according to claim 12, wherein at least one the recording device is operatively associated with a plurality of the encoding devices.

14. An apparatus according to claim 12, wherein the first video data is substantially real-time video data.

15. An apparatus according to claim 12, wherein the transmission rate of the first video data is faster than the encoding data rate of the buffered said new video data.

16. An apparatus comprising:

at least one controlling device configured to perform a controlling process for transmitting a 'play', a 'stop', and a 'pause' indication, wherein 'play' indication, when received by at least one encoding device configured to perform an encoding process, transitions each of the encoding process to a transmitting state and transmits first video data, wherein the 'pause' indication, when received by the at least one encoding device, transitions each of the encoding process to a buffering state and buffers a predefined portion of the most recently received new video data in a circular buffer, wherein the video data older than a predetermined time in the circular buffer is overwritten by subsequently received new video data, wherein the pause indication is received after a predetermined time of inactivity after an event, wherein the predetermined portion of the video data to be stored is determined based on a predetermined pre-event archival time and a post-even archival time, and wherein the 'stop' indication, when received by said at least one encoding device terminates the encoding process and discard the first video data stored in the circular buffer.

17. An apparatus according to claim 16, wherein at least one of the controlling device is operatively associated with a plurality of the encoding devices.

18. An apparatus according to claim 16, further comprising at least one recording device configured to execute a recording process for producing a recording of at least part of said first video data.

19. An apparatus according to claim 18, wherein at least one of the controlling device is, operatively associated with a plurality of recording devices.

20. An apparatus according to claim 16, wherein at least one of the encoding, recording and controlling devices are distributed across one or more the data networks.

* * * * *